United States Patent [19]

Zachariadis

[11] Patent Number: 4,644,508

[45] Date of Patent: Feb. 17, 1987

[54] METHOD AND APPARATUS FOR SELECTIVELY REINFORCING DETECTED SEISMIC WAVES

[75] Inventor: Robert G. Zachariadis, Dallas, Tex.

[73] Assignee: Mobil Oil Corporation, New York, N.Y.

[21] Appl. No.: 566,375

[22] Filed: Dec. 28, 1983

[51] Int. Cl.$^4$ .......................... G01V 1/38; G01V 1/00
[52] U.S. Cl. ........................................ 367/24; 367/57; 367/61
[58] Field of Search ........................ 367/11, 24, 15, 61, 367/121, 56, 57, 60, 62; 181/110, 107, 112, 124

[56] References Cited

U.S. PATENT DOCUMENTS

| | | | |
|---|---|---|---|
| 3,343,626 | 9/1967 | Sparks | 367/24 X |
| 3,371,310 | 2/1968 | Silverman | 367/57 |
| 3,952,281 | 4/1976 | Parrack | 181/112 |
| 3,967,233 | 6/1976 | Maguer et al. | 367/11 |
| 4,064,479 | 12/1977 | Ruehle | 181/112 X |
| 4,242,740 | 12/1980 | Ruehle | 367/15 |
| 4,244,037 | 1/1981 | Jelks | 367/121 |
| 4,441,174 | 4/1984 | Ray et al. | 367/24 X |

OTHER PUBLICATIONS

Galperin, E. I., Verticle Seismic Profiling, Society Exploration Geophysicists, #12, 1973, pp. 1-101.

Primary Examiner—Charles T. Jordan
Assistant Examiner—Brian S. Steinberger
Attorney, Agent, or Firm—Alexander J. McKillop; Michael G. Gilman; Charles J. Speciale

[57] ABSTRACT

A method and apparatus are disclosed for selectively reinforcing an acoustic wave traveling in a first predetermined direction in a body of water while attenuating an acoustic wave traveling in a second opposite direction. The output signals from vertically spaced receivers are appropriately delayed and summed to reinforce a wave traveling in the first direction and attenuate the wave traveling in the opposite direction. The invention is particularly useful for reinforcing desirably detected ascending acoustic waves and attenuating undesirably detected surface reflected descending waves.

5 Claims, 7 Drawing Figures

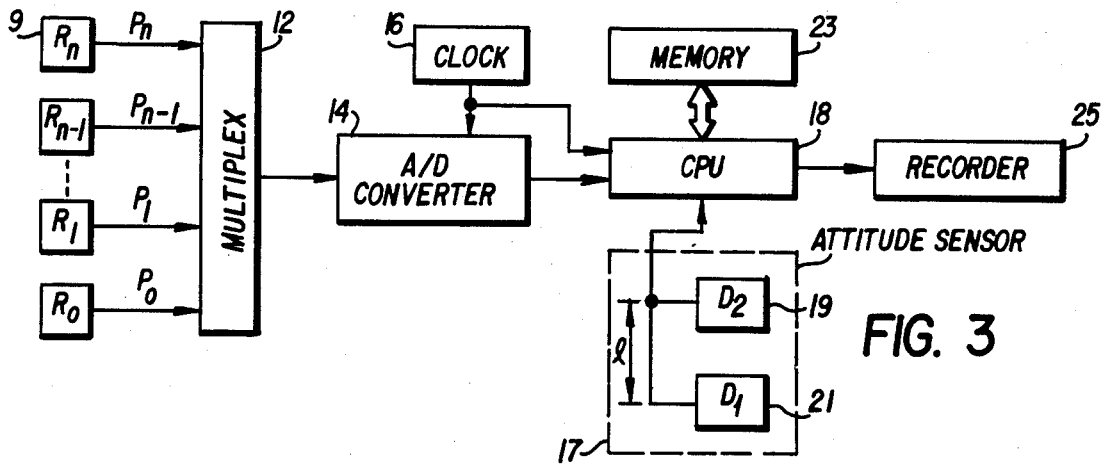
FIG. 3
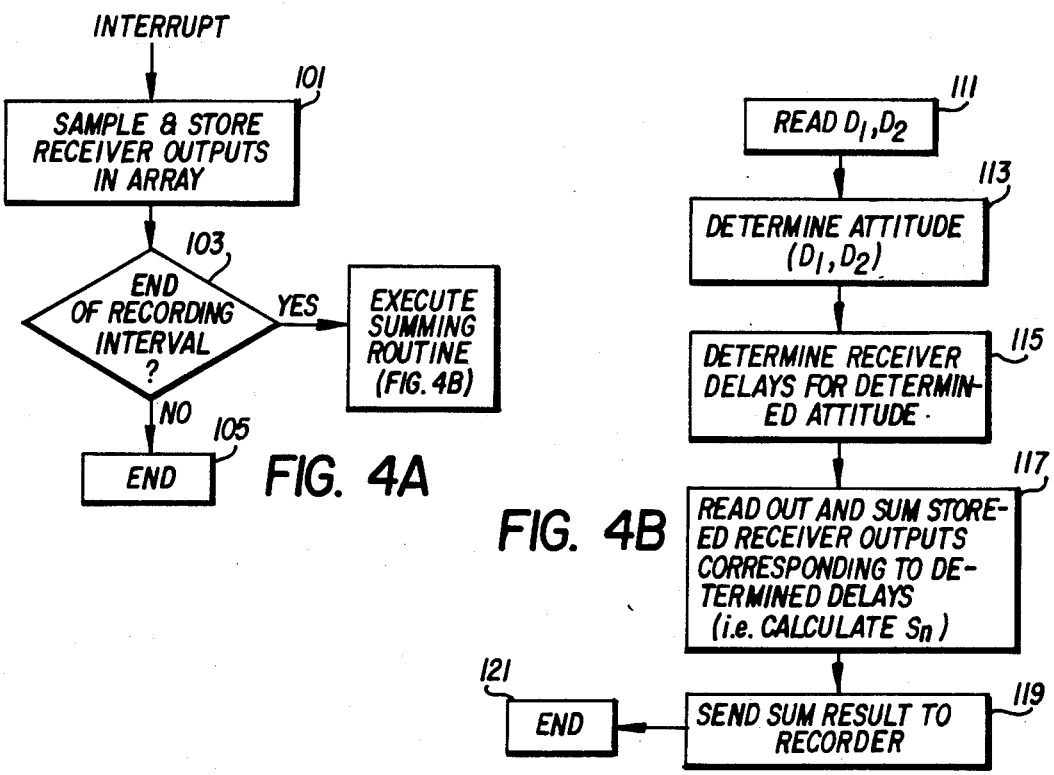
FIG. 4A
FIG. 4B
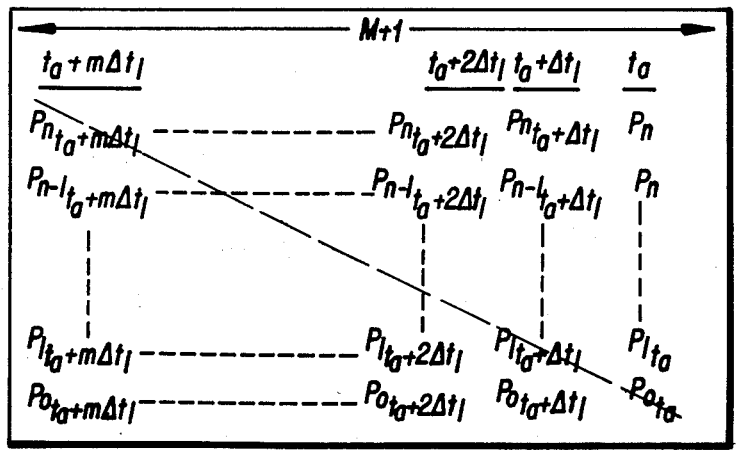
FIG. 5
SAMPLE ARRAY FORMAT

METHOD AND APPARATUS FOR SELECTIVELY REINFORCING DETECTED SEISMIC WAVES

BACKGROUND OF THE INVENTION

1. Field of the Invention

The present invention is directed to a method and apparatus for selectively reinforcing detected seismic waves traveling in a first direction and attenuating detected seismic waves traveling in a second opposite undesired direction. The invention is particularly directed to reinforcing seismic waves traveling in a body of water in an ascending direction.

2. Discussion of the Prior Art

Ocean bottom seismometry is a technique for recording seismic waves by means of receivers (hydrophones) which are located at or near an ocean bottom. Typically, a single receiver, is placed at or near the ocean bottom where it detects seismic reflection and/or refraction waves passing in an ascending direction from the ocean bottom towards the surface of the water. The reflection and/or refraction waves are created when an acoustic source, disposed at or below the water surface, is excited to generate an acoustic wave which travels downward through the water and ocean floor until it is reflected and/or refracted by subsurface formation boundaries, causing reflection and/or refraction of at least a portion of the wave back toward the water surface. When the ascending waves reach the water surface, they are again partially reflected, with a 180° phase change, and begin a downward movement through the water.

Because of the surface reflection, a seismic wave receiver positioned in the water to desirably detect ascending acoustic reflection and/or refraction waves, will also detect undesired descending reflection waves, causing interference in the detection of the ascending waves. This causes certain frequencies of ascending acoustic waves to be selectively reinforced, or attenuated, depending upon the relationship between the distance of the receiver below the sea surface and the wavelength ($\lambda$) of the acoustic wave. For example, as shown in FIG. 1, when an acoustic receiver 11 is placed at a depth Z corresponding to $\frac{1}{4}\lambda$, an ascending wave 13 of a fundamental frequency $f_o$, when reflected at the sea surface with a 180° phase change, will produce a descending wave 15 which, upon its arrival back at receiver 11, will be in phase with the ascending wave of the same frequency to reinforce the ascending wave. However, if the acoustic receiver is placed at a depth $Z=\frac{1}{2}\lambda$, the ascending and descending waves are out of phase thereat, causing attenuation of the fundamental frequency $f_o$.

The reinforcement phenomenon is repeated at frequencies where the receiver depth Z correspond to $\frac{3}{4}\lambda$, $5/4\lambda$, etc., i.e., at the odd harmonics of the fundamental frequency $f_o$, where $\lambda \cdot f_o = C$ (C=velocity of sound in seawater). Cancellation occurs when the depth Z corresponds to $2/4\lambda$, $4/4\lambda$, $6/4\lambda$, etc., i.e., at the even harmonics of $f_o$. For receivers located at other depths, there is partial interference between the ascending and descending waves, producing some reinforcement or attenuation, depending on depth and wavelength.

Because of this reinforcement/attenuation phenomenon, when a receiver is placed at or near the sea floor, e.g., on the continental shelf, there will be notches in the spectrum of the received and recorded seismic signal due to the interference caused by the descending reflection wave. This gap in the recorded waves complicates subsequent signal processing and results in the loss of useful seismic information.

SUMMARY OF THE INVENTION

One object of the present invention is the provision of a method and apparatus for selectively reinforcing an acoustic wave traveling in a first direction and attenuating an acoustic wave traveling in a second opposite direction.

Another object of the present invention is the provision of a method and apparatus which can be used with an ocean bottom seismometry apparatus to minimize the effects of a surface wave reflection on recorded seismic signals.

Another object of the invention is the provision of a method and apparatus, as in the preceeding paragraph, which minimizes the suface wave reflection effects no matter what orientation the ocean bottom seismometry apparatus assumes on the ocean floor.

Another object of the invention is the provision of an apparatus for minimizing the effects of a surface wave reflection on recorded seismic signals, which can be employed within a self-contained ocean bottom seismometry apparatus.

These and other objects, features and advantages of the invention are achieved by a plurality of vertically spaced acoustic wave receivers positioned in a body of water, which have their signal outputs phase shifted to place a predetermined amplitude point of a wave travelling in a desired direction, in phase in all receiver signal output signals. The phase shifted output signals are then combined so that the resulting combined output signal represents an acoustic reflection signal traveling in a desired direction, e.g., ascending, with minimum distortion occuring due to an acoustic reflection signal traveling in an opposite undesired, e.g., descending, direction. Control of the delay and combination of the output signals of the acoustic wave receivers is done, for example, by a programmed microprocessor, which may also be responsive to the attitude of the spaced receivers and operated to properly delay and combine the receiver output signals, no matter what attitude the ocean bottom seismometry apparatus assumes. The combined output signal is recorded by a conventional ocean bottom recorder for later analysis.

The method and apparatus aspects of the invention will be more clearly understood from the following detailed description, which is provided in connection with the accompanying drawings.

BRIEF DESCRIPTION OF THE DRAWINGS

FIG. 3 is a block diagram of the apparatus employed in the invention;

FIGS. 4A and 4B are flow charts depicting the operation of the computer illustrated in FIG. 3;

FIG. 5 is a memory array format useful in explaining the invention; and

DETAILED DESCRIPTION OF THE INVENTION

The present invention is directed to providing a method and apparatus which will selectively reinforce an acoustic wave traveling in a first direction and attenuate an acoustic wave traveling in a second opposite direction. For the purpose of simplifying subsequent description, it will be assumed that it is desired to reinforce an ascending wave and attenuate a descending wave. However, it should be understood that a descending wave could be reinforced and an ascending wave attenuated using the invention. Also, to simplify discussion, it will be assumed that the ascending wave is a reflection wave, however, the ascending wave can be a reflection wave, a refraction wave, or a combination of the two.

Figure 2:
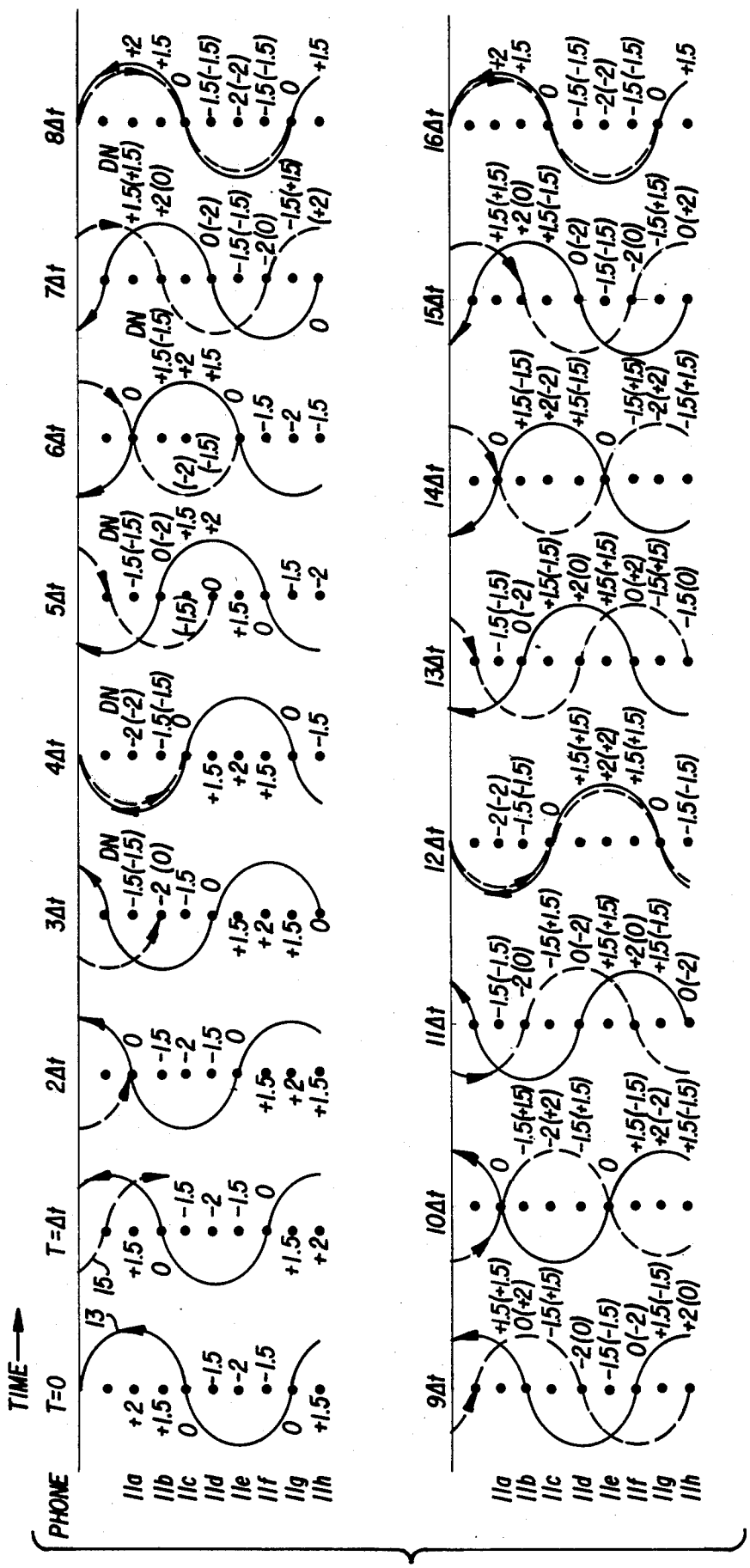
FIG. 2 illustrates the reflection waves received by a plurality of submerged vertically arranged receivers 11a . . . 11g over the time period t=0 to 16$\Delta$t, where $\Delta t = \frac{1}{8}\lambda$.

If a vertical string of receivers, e.g., hydrophones, are suitably spaced and suspended in water, it is possible to sum the output signals of the receivers in such a manner that acoustic wave amplitudes which progress in the ascending direction will add, while acoustic wave amplitudes which progress in a descending direction will subtract, thus making it possible to selectively reinforce the amplitudes of acoustic waves traveling in the desired ascending direction. FIG. 2 illustrates this in some detail. Each of a plurality of vertically arranged receivers $11a \ldots 11h$ is schematically shown, together with ascending 13 and surface reflected descending 15 acoustic waves for seventeen 17 different periods of time, beginning at a time $t=0$ and ending at a time $t=16\Delta t$, where $\Delta t$ represents a period of time corresponding to $\frac{1}{8}\lambda$ ($\lambda$ is the wavelength of the acoustic wave). FIG. 2 also illustrates the relative amplitude (using a scale of $-2, -1.5, 0, 1.5, 2$) of the ascending and descending acoustic waves. In the illustrated plots, the uppermost receiver is designated $11a$, the lowermost receiver is designated $11h$, an ascending wave is shown by solid lines and the descending wave is shown by dotted lines. The first receiver $11a$ is also positioned by a depth $Z = \frac{1}{4}\lambda$ from the surface.

At $t=0$, only the ascending wave 13 is shown. It has a relative amplitude of $+2$ at receiver $11a$, $+1.5$ at receiver $11b$, 0 at receiver $11d$, $-1.5$ at receiver $11e$, $-2.0$ at receiver $11f$, and 0 at receiver $11g$. At time $t=\Delta t$, the surface reflected wave begins appearing (denoted by dotted lines). At time $t=2\Delta t$, the descending waveform begins to reach receiver $11a$, but has not yet reached receivers $11b \ldots 11h$. At time $t=3\Delta t$, the descending reflection wave 15 begins to reach receiver $11b$ and interferes in amplitude with the amplitude of the ascending wave 13 then detected by receivers $11a$ and $11b$. However, at time $t=4\Delta t$, the descending reflection wave 15 is in phase with the ascending reflection wave 13, thus reinforcing instead of attenuating the ascending wave. Subsequently, at time $5\Delta t$ and $7\Delta t$, partial interference of the ascending 13 and descending 15 waves occurs and at time $6\Delta t$, complete interference (180° phase cancellation) occurs. At a time $8\Delta t$, the ascending 13 and descending 15 waves are again in phase. The pattern of partial interference, complete interference, partial interference, and phase coincidence repeats in subsequent time periods $9\Delta t \ldots 16\Delta t$.

If each of the vertically arranged receivers is spaced from one another by a predetermined distance Z, corresponding to, for example, $\frac{1}{8}\lambda$, then the receiver output signals can be summed with appropriate time delays so that any amplitude point on the ascending wave appears at the same phase position in all the output signals, whereas a particular amplitude point on a descending wave appears with differing and cancelling phases in the output signals. Thus, a summation of the delayed output signals from all receivers will reinforce an ascending wave and attenuate a descending wave. For example, assume at time $t_o$ a maximum amplitude point ($+2$ relative amplitude) of the ascending waves appears at the output of receiver $11a$, as shown in FIG. 2. This same maximum amplitude point previously appeared at receiver $11b$ at a time $t-\Delta t$, at receiver $11c$ at a time $t-2\Delta t$, at receiver $11d$ at a time $t-3\Delta t$, etc., where $\Delta t$ coincides with the time it takes the ascending waveform to travel between receivers, i.e., from $c \rightarrow b$, $b \rightarrow a$, etc.

Summing the receivers $11a \ldots 11h$ output signals (Pa ... Ph) with the delays illustrated below will produce a reinforced ascending wave component in the summed signal as follows (assuming an 8 receiver, $11a \ldots 11h$, array):

| Receiver Output Signal | Time Delay Before Summing | Relative Amplitude of of Maximum Point of Ascending Signal |
|---|---|---|
| Pa | 0 | +2 |
| Pb | t − Δt | +2 |
| Pc | t − 2 Δt | +2 |
| Pd | t − 3 Δt | +2 |
| Pe | t − 4 Δt | +2 |
| Pf | t − 5 Δt | +2 |
| Pg | t − 6 Δt | +2 |
| Ph | t − 7 Δt | +2 |
| Summed Result of Ascending Wave | | +16 |

In other words, if a maximum relative amplitude ($+2$) of an ascending wave appears at receiver $11a$ at a time $t_o$, this same relative amplitude point appears in phase in all the receiver output signals when the above delays are used. Accordingly, the relative amplitude of the delayed and summed ascending wave signal is $(+2) \times (8) = 16$.

By contrast, and as shown in FIG. 2 (see, for example, times $9\Delta t$ to $16\Delta t$), if a descending is considered and the same delays are applied, the following relative maximum amplitudes of the descending waves are produced for each receiver output signal Pa ... Ph.

| Receiver Output Signal | Time Delay Before Summing | Relative Amplitude of Maximum Amplitude Point of Descending Signal |
|---|---|---|
| Pa | 0 | +2 |
| Pb | t − Δt | 0 |
| Pc | t − 2 Δt | −2 |
| Pd | t − 3 Δt | 0 |
| Pe | t − 4 Δt | +2 |
| Pf | t − 5 Δt | 0 |
| Pg | t − 6 Δt | −2 |
| ph | t − 7 Δt | 0 |
| Summed Result (Descending Wave) | Total | 0 |

Figure 1:
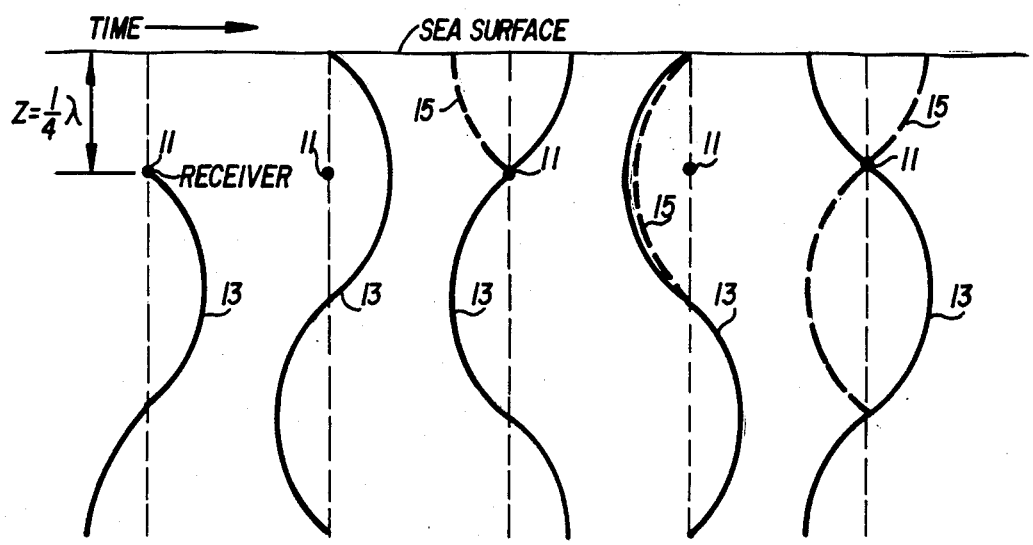
FIG. 1 illustrates the reflection of an ascending acoustic wave at a water surface.
Figure 6:
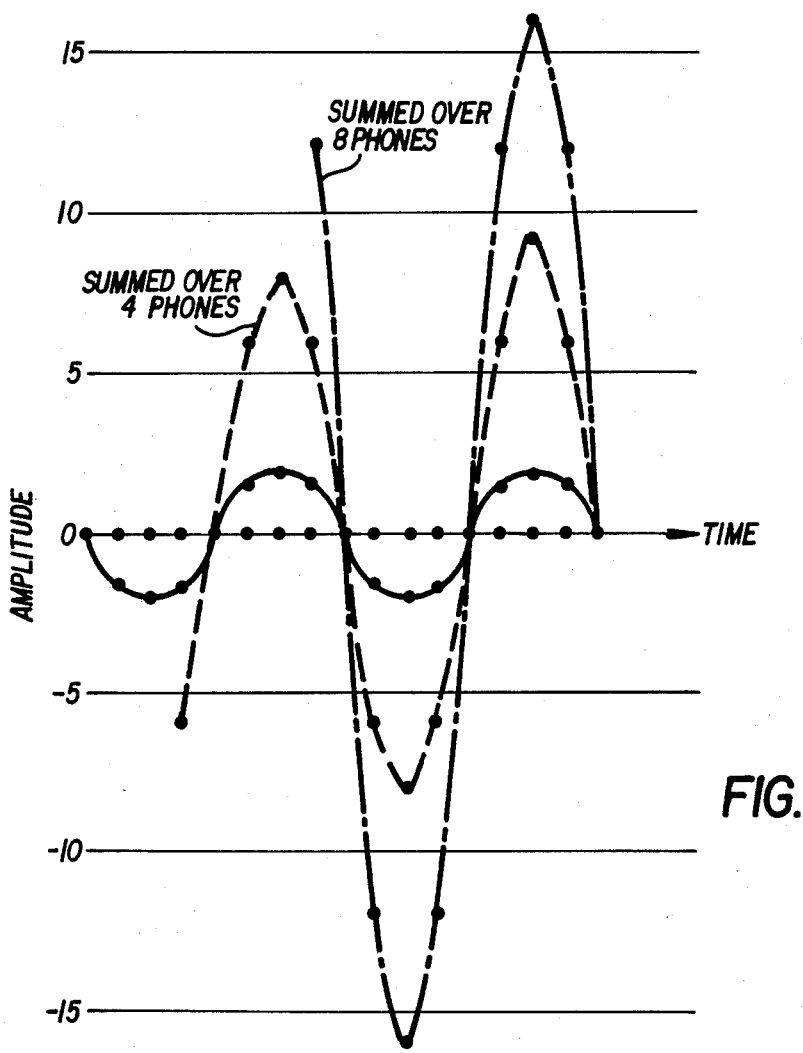
FIG. 6 is a wave diagram of the recorded signal produced by the invention.

As shown, summing the delayed receiver outputs causes complete cancellation of the descending wave in the summed signal. The same results are achieved (but with a smaller overall amplitude of the summed signal) by summing over four receivers, ($11a \ldots 11d$). FIG. 6 illustrates the results of summing the delayed outputs of four and eight vertically spaced (by a distance corresponding to $\frac{1}{8}\lambda$) receivers $11a \ldots 11d$, $11a \ldots 11h$, with the time delays specified above. The black dots illustrated in FIG. 6 represent exemplary signal sampling points, since in actual implementation a digital signal sampling, delay and summing system, as described below, is preferably used in the invention. It should be appreciated that although the foregoing discussion mentions time delays which are applied to the output signals Pa . . . Ph of the receivers 11a . . . 11h in a vertical array, a time delay is in fact a phase shift and that the invention contemplates phase shifting (both positive and negative) of the receiver output signals Pa . . . Ph prior to their summation to properly align the output signals so that a particular amplitude point on an ascending wave appears substantially in phase in all receivers output signals. Also, although the descending wave can be completely cancelled as discussed above under ideal conditions (proper array depth spacing Z) and for certain frequencies of the descending wave, under actual conditions the degree of attenuation will vary; however, the ascending wave will always be phase additive in the summing operation to produce a resulting summed signal in which the ascending wave has a magnitude much greater than that of any interfering descending wave which minimize distortions produced by the descending wave.

The above discussion can be generalized for an array of vertically spaced receivers $R_o \ldots R_n$, in which the receivers $R_1 \ldots R_n$ are each respectively spaced by a distance $Z_1 \ldots Z_n$ from a lowest receiver $R_o$ in the array and with the travel time between receivers of $Z_n/Vw$, where $Vw$ is the velocity of an acoustic wave in water. The corresponding receiver output signals $P_o \ldots P_n$ are shown in the table below.

| Receiver # | Distance From $R_o$ | Vertical Time Delay Required for Summing | Signal Output at Time t |
|---|---|---|---|
| $R_n$ | $Z_n$ | $Z_n/Vw$ | $P_n(t)$ |
| $R_{n-1}$ | $Z_{n-1}$ | $Z_{n-1}/Vw$ | $P_{n-1}(t)$ |
| . | . | . | . |
| . | . | . | . |
| . | . | . | . |
| $R_1$ | $Z_1$ | $Z_1/Vw$ | $P_1(t)$ |
| $R_0$ | $Z_0 = 0$ | 0 | $P_0(t)$ |

The summation to reinforce an ascending wave and attenuate a descending wave can thus be generalized as follows:

$$S = \sum_{o}^{n} P_n(t_o + Z_n/Vw) \qquad (1)$$

where S is the resultant summed output signal, $t_o$ is the time when an ascending waveform first reaches the lowermost receiver in the array, $P_n$ is the output signal of a respective receiver ($R_o \ldots R_n$) and ($t_o + Z_n/Vw$) is the time taken for an ascending wave to reach the $R_n$th receiver after reaching the lowermost receiver. For any given receiver array, the distance $Z_n$ is known, as is the acoustic wave velocity $Vw$, and the only variable in the equation is a measured receiver output signal $P_n$.

The phase shifting and summation represented by equation (1) is preferably performed in the invention by a microprocessor controlled signal sampling and summing apparatus, as illustrated in FIG. 3. The analog outputs of receivers $R_o \ldots R_n$ are connected to a multiplexer 12, which supplies multiplexed analog receiver output signals ($P_o \ldots P_n$) to a sampling analog-to-digital converter 14. Analog-to-digital converter 14 under control of sampling clock 16 supplies successive digitized samples of the output signals $P_o \ldots P_n$ to computer 18, which successively stores in memory 23 the received samples as they are acquired. Computer 18 then repetitively reads out one stored sample for each of the receivers $R_o \ldots R_n$ which corresponds to the phase shift necessary to phase align the receiver output signals, sums the samples and supplies the summed signal to recorder 25. The recording interval of recorder 25, which determines the times when computer 18 extracts and sums the digital samples, is typicaly 1, 2, 4 or 8 milliseconds, whereas the sampling interval is some fraction $\Delta w$ of the recording interval. As a result, numerous samples, each delayed from a preceding sample by the sampling interval, will be recorded for each recording interval. Consequently, when computer 18 extracts a stored sample of a receiver output for summing, it selects that stored sample which has a delay which is the closest in time to the delay time ($t_o + Z_n/Vw$) in equation (1). The thus read out samples represent appropriately delayed output signals $P_o \ldots P_n$ from receivers $R_o \ldots R_n$, which are added and supplied to recorder 25. Computer 18 and memory 23 effectively act as a phase shifter, as the selected samples represent phase shifted receiver signals, the phase shifting being by an amount which places a predetermined point on an ascending acoustic wave at the same phase position in each of the receiver output signals.

In order to properly delay and sum the respective output signals $P_o \ldots P_n$ from receivers $R_o \ldots R_n$, it is necessary that the receivers be vertically spaced from each other by a distance corresponding to the time it takes an ascending waveform to travel from one receiver (preceding receiver) to the next one above it (successive receiver). Since proper summing is based on a predetermined vertical spacing of the receivers, errors are introduced if there is any deviation from this spacing. Deviations can occur if there is an improper subsea orientation of the receiver array, i.e., deviations from the vertical. To overcome this problem, an orientation detector in the form of an attitude sensor 17 can be used to determine the amount of deviation from a predetermined receiver array orientation and computer 18 can correct for such deviations by appropriate selection of stored signal samples. The attitude sensor may employ, for example, a plurality of depth sensors, e.g., two depth sensors 19,21, spaced by a predetermined distance L. By determining the difference in sensed depth ($D_2 - D_1$) by sensors 19 and 21, corresponding to a detected distance l between sensors, and the deviation thereof from the predetermined distance L, computer 8 can determine the degree of deviation of the receivers $R_o \ldots R_n$ from the predetermined vertical spacing between them and appropriately adjust the delay (by adjusting the selection of selected signal samples) in the respective receiver output signals which are added. Stated otherwise, the delay term ($t_o + Z_n/Vw$) in equation (1) can be rewritten as $$\text{delay} = (t_o + Z_n/Vw + a_n) \qquad (2)$$

where $a_n$ is an additional phase or delay term which varies in accordance with variations in the vertical spacing of the receivers $R_o \ldots R_n$, caused by deviation of the receiver array from a predetermined vertical orientation. The additional delay $a_n$ is handled in the summation produced by computer 18 by the selection of a delayed signal sample for a respective receiver which corresponds to a delay representing $(t_o+Z_n/Vw+a_n)$. Thus, it is possible with a deviated receiver array to still replicate receiver output signals which would be produced when there is no deviation.

The program executed by computer 18 is shown in flow chart form in FIGS. 4A, 4B.

To facilitate discussion of the program, the manner in which receiver output signal samples are stored in memory 23 will first be described. As digitized samples of the output signals $P_o \ldots P_n$ are received by computer 16, they are sequentially stored in memory 23 as an array of the format shown in FIG. 5. In the array, each row corresponds to one receiver output signal, while each column represents a set of samples from all receivers during one sampling interval. As discussed above, receiver output signal samples are repeatedly stored in memory 23 at a sampling rate corresponding to a time interval $\omega = \Delta t_1$, which is some fraction of an interval at which recorder 25 receives and records summed data samples. The data samples which arrive and are stored every $\Delta t_1$ milliseconds for each output signal $P_n$ are subsequently extracted for summing by computer 18 at a rate corresponding to the recording interval. FIG. 5 illustrates the samples stored for one recording interval. The array contains M+1 digital samples, which have been stored for each of the receiver output signals $P_o \ldots P_n$.

At the end of each recording interval, computer 18 selects one digital sample for each output signal (one sample in each row of FIG. 5) in accordance with the delay determined to be appropriate for that output signal to phase align an ascending wave in the receiver output signals. That is, one digital sample for each output signal is selected in accordance with the delay component in equation (1) above, or in equation (2) above if the deviation correction aspect of the invention is employed. The selected samples, which represent appropriated delayed output signals of each of the receivers, are then summed and supplied to recorder 25. In practice, samples will be selected from the sample array by computer 18 along a generally diagonal line, as shown in FIG. 5.

It should be appreciated that since sampling continually occurs at a higher frequency than the frequency of data recording, another array of the format shown in FIG. 5 is being constructed while data is being selected and summed from a previously constructed data array.

Computer 18 thus performs the summation operation of equation (1), which can be rewritten in terms of data samples as $$S = \sum_{o}^{n} P_n(t_o + m_x \Delta t_1) \quad (3)$$

where $m_x \Delta t_1 = Z_n/Vw$ (equation (1)) and $(t_o+m_x\Delta t_1)$ is the time of the nearest data sample to the interval $(t_o+Z_n/Vw)$. If receiver orientation correction is employed $(t_o+m_x\Delta t_1)$ is the time of the nearest data sample to the time interval $(t_o+Z_n/Vw+a_n)$.

The overall program executed by computer 18 is illustrated by the flow charts shown in FIGS. 4A and 4B. Data acquisition and storage is performed each time an interrupt signal is received by the computer 18 from clock 16. Clock 16 supplies this signal to the computer at the same time it operates A/D converter 14 to sample and digitize an incoming receiver output signal. Upon receiving the interrupt signal, computer 18 stores at step 101 the incoming digital sample in an appropriate place in an array of the form shown in FIG. 5. Computer 18 then determines if the just stored sample is the last sample needed to complete a recording interval sample array in step 103. If the array is not completed, the computer proceeds to step 105, where it awaits the next interrupt signal from clock 16.

If, in step 103, computer 18 determines that a data array is complete, i.e., the end of a recording interval, it proceeds to step 106 where it executes the summing routine shown in FIG. 4B. The first step in the summing routine is to read and store the output signals of depth sensors 17 and 19. These signals are then subtracted $(D_2-D_1)$ in step 113 to determine the deviation of the receiver array from a predetermined position. The magnitude of the difference between the calculated difference $(D_2-D_1)$ calc. and a predetermined reference distance $(D_2-D_1)$ ref. represents the amount of deviation of the receiver array from a vertical orientation (the deviation of 1 from L as described above) and, in turn, the deviation of the receiver spacing from the predetermined spacing $Z_n/Vw$. Once the deviation is determined, computer 18 proceeds to step 115, where it determines the amount of delay compensation $(a_n)$ required. This can be done, for example, by a table look-up of various adjustments corresponding to various calculated amounts of receiver array deviations from the norm.

The computer then proceeds to step 117, where it selects those stored receiver output samples which are closest in time to delays which are determined in accordance with equation (2) above; that is, are closest in time to a delay component $(t_o+Z_n/Vw)$ associated with the spacing of the receivers and a delay component $a_n$ associated with receiver array orientation. After the receiver samples are selected, they are then summed in step 117 to produce a signal representing the amplitude of the detected acoustic wave at a predetermined point in time. This sum signal is then sent, in step 119, to digital recorder 25, after which the program ends.

It should be appreciated that the degree of reinforcement of the desired ascending wave and of cancellation of the undesired descending wave in the summed signal S will be affected by the spacing of the receiver array from the water surface and will be different for different frequencies of the ascending acoustic wave. However, since the ascending wave frequency components in the receiver output signals are substantially in phase before summing, even if complete cancellation of the descending wave does not occur, the ascending wave component in the summed signal will be much larger than the descending wave component, whereby the descending wave component will not significantly interfere with detection and recording of the desired ascending wave.

While preferred embodiments of the method and apparatus of the invention have been shown and described above, it should be apparent that many modifications can be made without departing from the spirit and scope of the invention. Accordingly, the invention is not limited by the foregoing description, but is only limited by the scope of the appended claims.

I claim:

1. A method of detecting an acoustic seismic wave traveling in a first predetermined direction in a body of water by means of receivers located beneath the surface of said body of water, comprising the steps of:

providing a plurality of seismic wave receivers $R_o \ldots R_n$ beneath said surface, said receivers being spaced at predetermined vertical separations, each of said receivers detecting said acoustic seismic wave and providing a respective output signal representative thereof;

time shifting the output signals of at least two of said receivers by predetermined respective amounts so that a predetermined amplitude point on said acoustic seismic wave traveling in said first predetermined direction is substantially phase aligned in the time shifted output signals of said receivers;

combining the phase aligned output signals of said receivers to produce a wave representing said acoustic seismic wave;

detecting output signals which are produced by said receivers when no deviation of said array from said predetermined vertical separations exists; and determining the deviation of said receivers from said predetermined vertical separations, wherein said time shifting step time shifts the output signal of a successive vertical receiver relative to a preceding vertical receiver by an amount corresponding to the time it takes said acoustic seismic wave to travel verticaly from said preceding to said successive receiver and wherein said time shifting step also time shifts the output signals of said receivers to replicate said output signals which are produced by said receivers of said array when no such deviation from said predetermined vertical separations occurs.

2. A method of detecting an acoustic seismic wave traveling in a first predetermined direction in a body of water by means of receivers located beneath the surface of said body of water, comprising the steps of:

providing a plurality of vertically spaced seismic wave receivers $R_o \ldots R_n$ beneath said surface, each of said receivers detecting said acoustic seismic wave and providing a respective output signal representative thereof;

time shifting the output signals of at least two of said receivers by predetermined respective amounts so that a predetermined amplitude point on said acoustic seismic wave traveling in said first predetermined direction is substantially phase aligned in the time shifted output signals of said receivers;

combining the phase aligned output signals of said receivers to produce a wave representing said acoustic seismic wave;

digitizing and sampling the output signals of said receivers; and storing said digitized samples; and wherein said phase shifting and combining step comprises selecting and summing stored samples of said output signals in accordance with the relationship $$S = \sum_{o}^{n} P_n(t_o + m_x \Delta t_1)$$

where S is the resulting sum, $P_n$ represents the amplitude of the output signal of a receiver $R_n$ and $(t_o + m_x \Delta t_1)$ represents a selected sample which is delayed by an amount $(m_x \Delta t_1)$ from a reference time $t_o$, where $m_x$ is a sample number and $\Delta t_1$ is the sampling interval.

3. A method as in claim 2, wherein said digitized samples are stored as an array of samples for a predetermined recording interval, and wherein said method further comprises the step of recording a sum signal S for each recording interval.

4. An apparatus for detecting an acoustic seismic wave traveling in a first predetermined direction in a body of water by means of receivers located beneath the surface of said body of water, comprising:

a plurality of vertically spaced seismic wave receivers beneath said surface, said receivers forming a vertical receiver array having predetermined vertical separations between receivers, each of said receivers providing a respective output signal;

means for time shifting the output signals of at least some of said receivers by predetermined respective amounts so that a predetermined amplitude point on an acoustic seismic wave traveling in said first predetermined direction is substantially phase aligned in the output signals of said receivers;

means for combining the phase aligned output signals of said receivers to produce a wave representing said acoustic seismic wave;

means for detecting output signals which are produced by said receivers when no deviation of said array from said predetermined vertical separations exists; and deviation determining means for determining a deviation of said array from said predetermined vertical separations, said time shifting means comprising means for time shifting the output signals of said receivers to replicate said output signals which are produced by said receivers when there is no deviation of said array from said predetermined vertical separations.

5. An apparatus as in claim 4, wherein said deviation determining means comprises a plurality of vertically spaced depth sensors and means for calculating said deviation from the output signals of said depth sensors, and said phase shifting means is responsive to output signals produced by said calculating means representing said deviation from said predetermined vertical separations.

* * * * *